United States Patent
Wang et al.

(10) Patent No.: US 11,174,871 B2
(45) Date of Patent: Nov. 16, 2021

(54) AIR DUCT ASSEMBLYS, AND FAN HEATERS

(71) Applicants: GD MIDEA ENVIRONMENT APPLIANCES MFG CO., LTD., Zhongshan (CN); MIDEA GROUP CO., LTD., Foshan (CN)

(72) Inventors: Qing Wang, Zhongshan (CN); Lie Ma, Zhongshan (CN); Chengbo Tan, Zhongshan (CN)

(*) Notice: Subject to any disclaimer, the term of this patent is extended or adjusted under 35 U.S.C. 154(b) by 48 days.

(21) Appl. No.: 16/624,846

(22) PCT Filed: Apr. 20, 2018

(86) PCT No.: PCT/CN2018/083971
§ 371 (c)(1),
(2) Date: Dec. 19, 2019

(87) PCT Pub. No.: WO2019/001114
PCT Pub. Date: Jan. 3, 2019

(65) Prior Publication Data
US 2021/0172454 A1     Jun. 10, 2021

(30) Foreign Application Priority Data
Jun. 30, 2017    (CN) .......................... 201710535493.2

(51) Int. Cl.
*F04D 29/42* (2006.01)
*F24H 3/04* (2006.01)
(Continued)

(52) U.S. Cl.
CPC ............ *F04D 29/422* (2013.01); *F24F 13/02* (2013.01); *F24H 3/0411* (2013.01); *F24D 19/0087* (2013.01); *F24H 9/0073* (2013.01)

(58) Field of Classification Search
CPC .... F04D 29/422; F24H 3/0411; F24H 9/0073; F24D 19/0087; F24F 13/02
See application file for complete search history.

(56) References Cited

U.S. PATENT DOCUMENTS 3,398,882 A * 8/1968 Zenkner ................. F04D 17/04
                                                            415/53.3
6,086,324 A * 7/2000 Ikeda ..................... F04D 17/04
                                                            415/53.1
(Continued)

FOREIGN PATENT DOCUMENTS

CN        101619875 A      1/2010
CN        201448947 U      5/2010
(Continued)

OTHER PUBLICATIONS

The first Office Action dated Apr. 25, 2019 in the corresponding CN application No. 201710535493.2.
(Continued)

*Primary Examiner* — Audrey B. Walter
(74) *Attorney, Agent, or Firm* — Kilpatrick Townsend & Stockton

(57) ABSTRACT

Disclosed are an air duct assembly and a fan heater applying in the air duct assembly, which includes a volute tongue positioned in the volute forms an air duct with the volute. The air duct is configured with an air inlet and an air outlet. A cross-flow wind turbine positioned in the air duct introduce the airflow into the air duct from the air inlet, and blow out the airflow in the air duct through the air outlet. The volute includes a first volute tongue member, the size of the angle between the line connecting the root portion M of the first volute tongue member to the axis O of the cross-flow wind turbine and the line connecting the root portion N of the second volute tongue member to the axis O of the cross-flow wind turbine on the same cross-section is from 110° to 170°.

18 Claims, 10 Drawing Sheets

(51) Int. Cl.
*F24H 9/00* (2006.01)
*F24D 19/00* (2006.01)
*F24F 13/02* (2006.01)

(56) References Cited

U.S. PATENT DOCUMENTS

| | | | | |
|---|---|---|---|---|
| 2012/0111045 A1* | 5/2012 | Ikeda | ............... | F04D 17/04 |
| | | | | 62/262 |
| 2017/0276379 A1* | 9/2017 | Ikeda | ............... | F24F 13/30 |
| 2018/0112888 A1* | 4/2018 | Na | ............... | F04D 29/422 |

FOREIGN PATENT DOCUMENTS

| | | |
|---|---|---|
| CN | 201748645 U | 2/2011 |
| CN | 2011077484 A1 | 6/2011 |
| CN | 102644974 A | 8/2012 |
| CN | 102900676 A | 1/2013 |
| CN | 105402821 A | 3/2016 |
| CN | 2016145661 A | 8/2016 |
| CN | 107166496 A | 9/2017 |
| CN | 206919121 U | 1/2018 |

OTHER PUBLICATIONS

International Search Report dated Jul. 5, 2018 in the corresponding International Application No. PCT/CN2018/083971.

* cited by examiner

AIR DUCT ASSEMBLYS, AND FAN HEATERS

CROSS-REFERENCES TO RELATED APPLICATIONS

The present disclosure is the Continuation Application of PCT Application with No. PCT/CN2018/083971, filed on Apr. 20, 2019, which claims the priority of China Patent Application with No. 201710535493.2, entitled "Air duct assemblies, and fan heaters", filed on Jun. 30, 2017, which is hereby incorporated by reference in its entirety.

FIELD

The present disclosure relates to the field of fan heaters, and more particularly relates to An air duct assembly and a fan heater applying the air duct assembly.

BACKGROUND

At present, the fan heater, as a new type of heating device, is widely used because of its advantages of convenient use and simple operation. However, the air volume of existing fan heater is generally low, which cannot meet the user's increasing demand.

SUMMARY

One embodiment of the present disclosure provides an air duct assembly, aiming to increase the amount of airflow from a fan heater.

In order to achieve the above purpose, the air duct assembly of the present disclosure, applied to the fan heater, includes:

a volute comprising a first volute tongue member;

a volute tongue positioned in the volute, cooperated with the volute to define an air duct having an air inlet and an air outlet, and comprising a second volute tongue member; and a cross-flow wind turbine positioned in the air duct, and configured to introduce an airflow into the air duct through the air inlet, and blow the airflow in the air duct out through the air outlet;

the first volute tongue member and the second volute tongue member are respectively located at two sides of the air inlet; and on a same cross section, an angle between a first line connecting a root portion M of the first volute tongue member to an axis O of the cross-flow wind turbine and a second line connecting a root portion N of the second volute tongue member to the axis O of the cross-flow wind turbine is in a range of 110° to 170°.

In one embodiment, a minimum distance B between the first volute tongue member and the cross-flow wind turbine is in a range of 2 mm to 4 mm.

In one embodiment, a minimum distance C between the second volute tongue member and the cross-flow wind turbine is in a range of 2 mm to 4 mm.

In one embodiment, the volute further includes: a first air deflector extending towards the air outlet from the first volute tongue member and includes: a first end adjacent to the air outlet, a second end away from the air outlet, and a protrusion positioned between the first end and the second end, and facing the air duct.

In one embodiment, the protrusion is at the end of the first air deflector adjacent to the air outlet, and a distance D between the root portion N and the protrusion is the shortest distance between the root portion N of the second volute tongue member and any point on the first air deflector.

In one embodiment, a ratio of the distance D to a width E of air outlet is 1:(2 to 2.5).

In one embodiment, the distance D is in a range of 18 mm to 30 mm.

In one embodiment, the volute tongue further includes: a second air deflector extending towards the air outlet from the second volute tongue member. A surface of the first air deflector located outside the air duct or on a surface of the second air deflector located outside the air duct is provided with a wire buckle. Or a surface of the first air deflector located outside the air duct and a surface of the second air deflector located outside the air duct are both provided with a wire buckle.

In one embodiment, the volute includes: two ends disposed along an axial direction of the cross-flow wind turbine, and each of the two end defines a mounting hole, and the volute tongue includes two mounting columns corresponding to the mounting holes, and each of the mounting columns is inserted into each corresponding mounting holes.

The present disclosure also provides a fan heater, which includes a housing and an air duct assembly is configured in the housing, and the air duct assembly is applied to the fan heater, includes:

a volute comprising a first volute tongue member;

a volute tongue positioned in the volute, cooperated with the volute to define an air duct having an air inlet and an air outlet, and comprising a second volute tongue member; and a cross-flow wind turbine positioned in the air duct, and configured to introduce an airflow into the air duct through the air inlet, and blow the airflow in the air duct out through the air outlet;

the first volute tongue member and the second volute tongue member are respectively located at two sides of the air inlet; and on a same cross section, an angle between a first line connecting a root portion M of the first volute tongue member to an axis O of the cross-flow wind turbine and a second line connecting a root portion N of the second volute tongue member to the axis O of the cross-flow wind turbine is in a range of 110° to 170°.

In one embodiment, the volute or the volute tongue of the air duct assembly includes a positioning lug having a positioning hole. And the housing of the fan heater includes a positioning column fitted into the positioning hole; or the volute and the volute tongue of the air duct assembly both includes a positioning lug having a positioning hole. And the housing of the fan heater includes two positioning column, each of the positioning columns is fitted into each one positioning hole.

In one embodiment, the volute of the air duct assembly includes a fixing column extended towards and fixed to the housing of the fan heater.

In one embodiment, a minimum distance B between the first volute tongue member and the cross-flow wind turbine is in a range of 2 mm to 4 mm.

In one embodiment, a minimum distance C between the second volute tongue member and the cross-flow wind turbine is in a range of 2 mm to 4 mm.

In one embodiment, a first air deflector extending towards the air outlet from the first volute tongue member and includes: a first end adjacent to the air outlet. A second end away from the air outlet. And a protrusion positioned between the first end and the second end, and facing the air duct.

In one embodiment, the protrusion is at the end of the first air deflector adjacent to the air outlet, and a distance D between the root portion N and the protrusion is the shortest distance between the root portion N of the second volute tongue member and any point on the first air deflector.

In one embodiment, a ratio of the distance D to a width E of air outlet is 1:(from 2 to 2.5).

In one embodiment, the distance D between the root portion N of the second volute tongue member and the protrusion is in a range of 18 mm to 30 mm.

In one embodiment, the volute tongue further includes: a second air deflector extending towards the air outlet from the second volute tongue member. A wire buckle is arranged on a surface of the first air deflector located outside the air duct or on a surface of the second air deflector outside the air duct. Or the wire buckles are arranged on the surface of the first air deflector located outside the air duct and the surface of the second air deflector outside the air duct.

In one embodiment, the volute includes: two ends disposed along an axial direction of the cross-flow wind turbine, and each of the two end defines a mounting hole, the volute tongue includes two mounting columns corresponding to the mounting holes, and each of the mounting columns is inserted into each corresponding mounting holes.

According to embodiments of the present disclosure, since the angle between a first line connecting a root portion M of the first volute tongue member to an axis O of the cross-flow wind turbine and a second line connecting a root portion N of the second volute tongue member to the axis O of the cross-flow wind turbine is in a range of 110° to 170°. The air duct structure is optimized. The leakage flow of the gap between the two volute portions is reduced, the flow state of the leakage flow is improved. And the impact of the leakage flow on the cross-flow wind turbine is reduced. So that the air inlet condition of the wind side vane passage of the cross-flow wind turbine and the internal flow field of the cross-flow wind turbine are effectively improved. The scale of the eccentric worm which inside the cross-flow wind turbine is reduced. The shape and position of the eccentric worm are improved. Thus the eccentric worm is made smaller, rounded, and close to the inner edge portion of the cross-flow wind turbine. Hence, the effective flow area inside the cross-flow wind turbine is increased. And the internal flow field of the cross-flow wind turbine is made more stable and the air volume is increased.

BRIEF DESCRIPTION OF THE DRAWINGS

The embodiments of the present disclosure will be clearly and completely described in the following with reference to the accompanying drawings. Embodiments to be described are only a part rather than all of the present disclosure.

Figure 2:
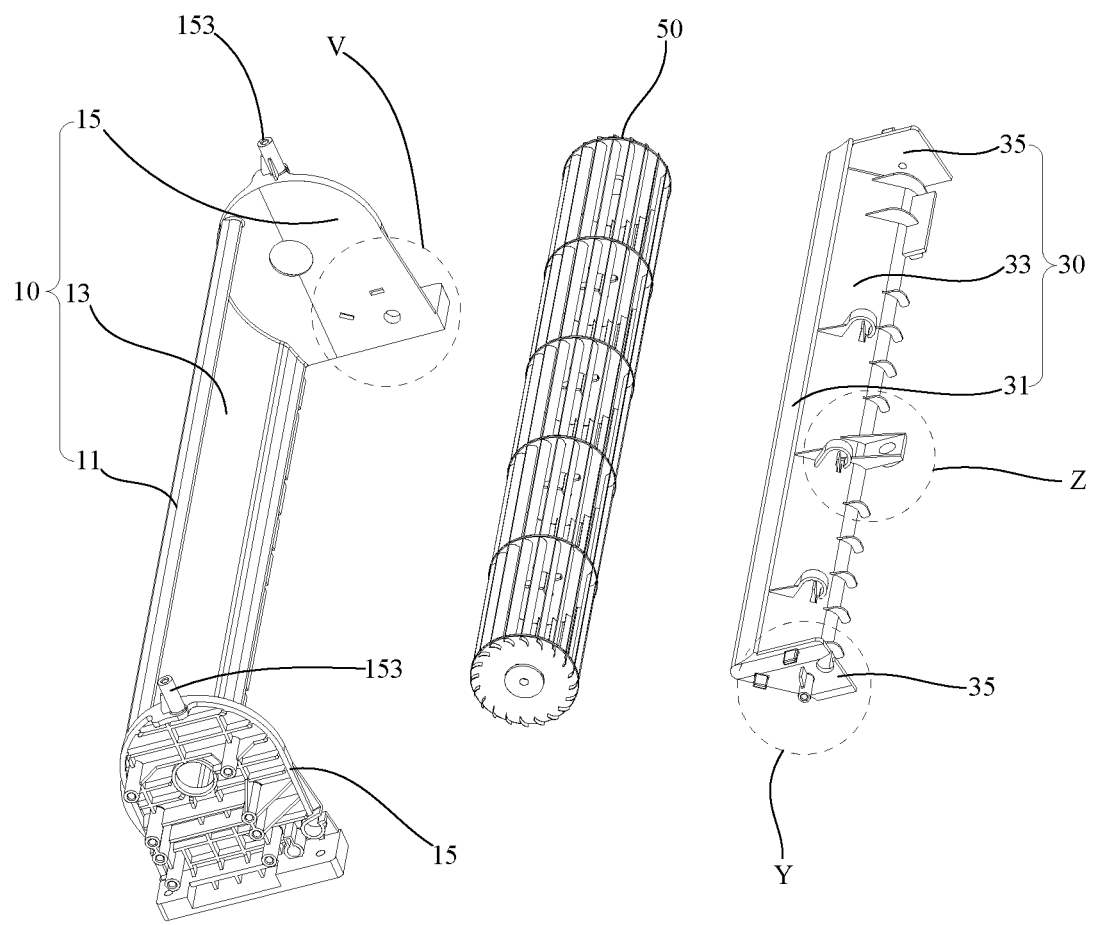
FIG. 2 is a schematic exploded view of the air duct assembly according to FIG. 1.
Figure 9:
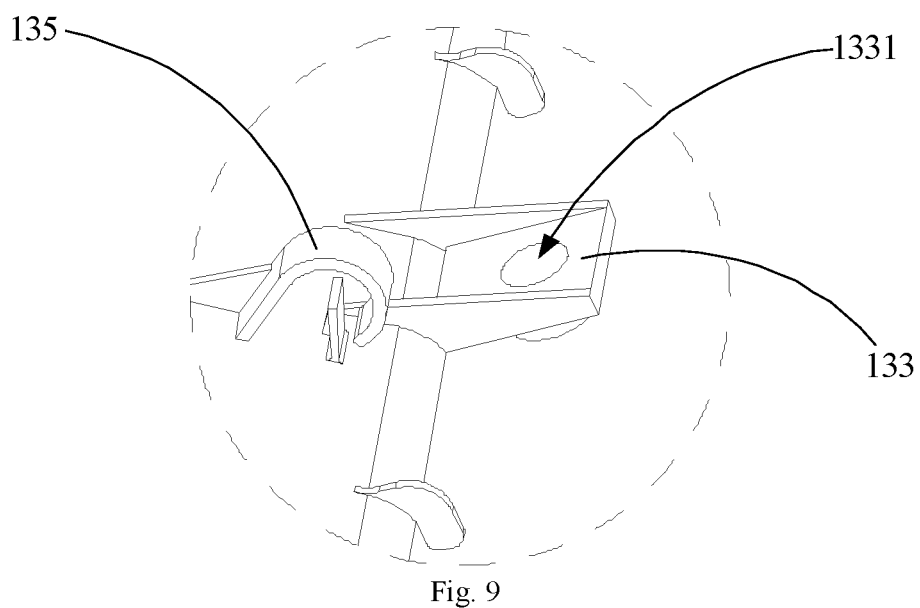

8 is a schematic enlarged structural view at Y according to FIG. 2;

FIG. 9 is a schematic enlarged structural view at Z according to FIG. 2.

Figure 10:
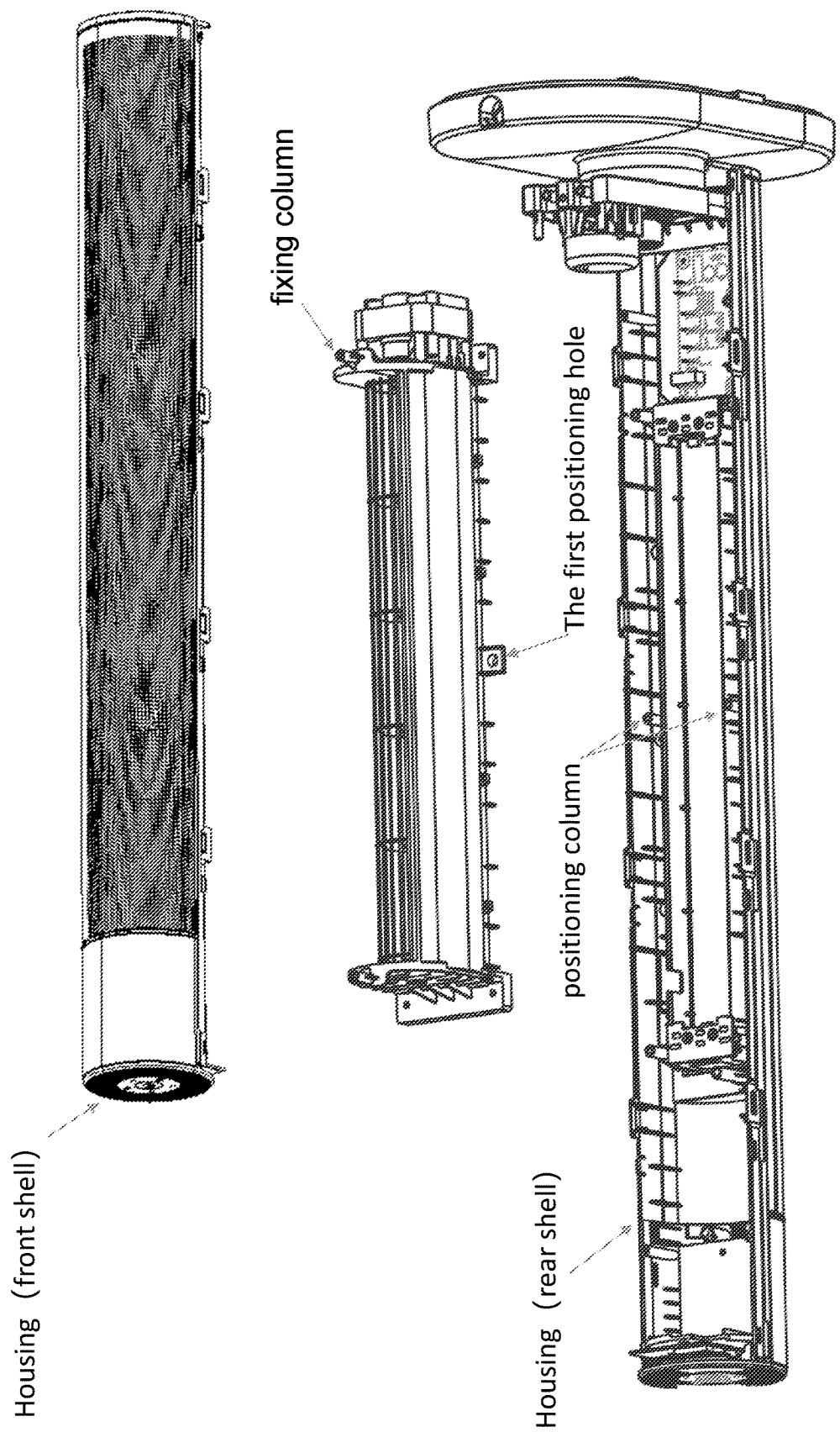
Figure 11:
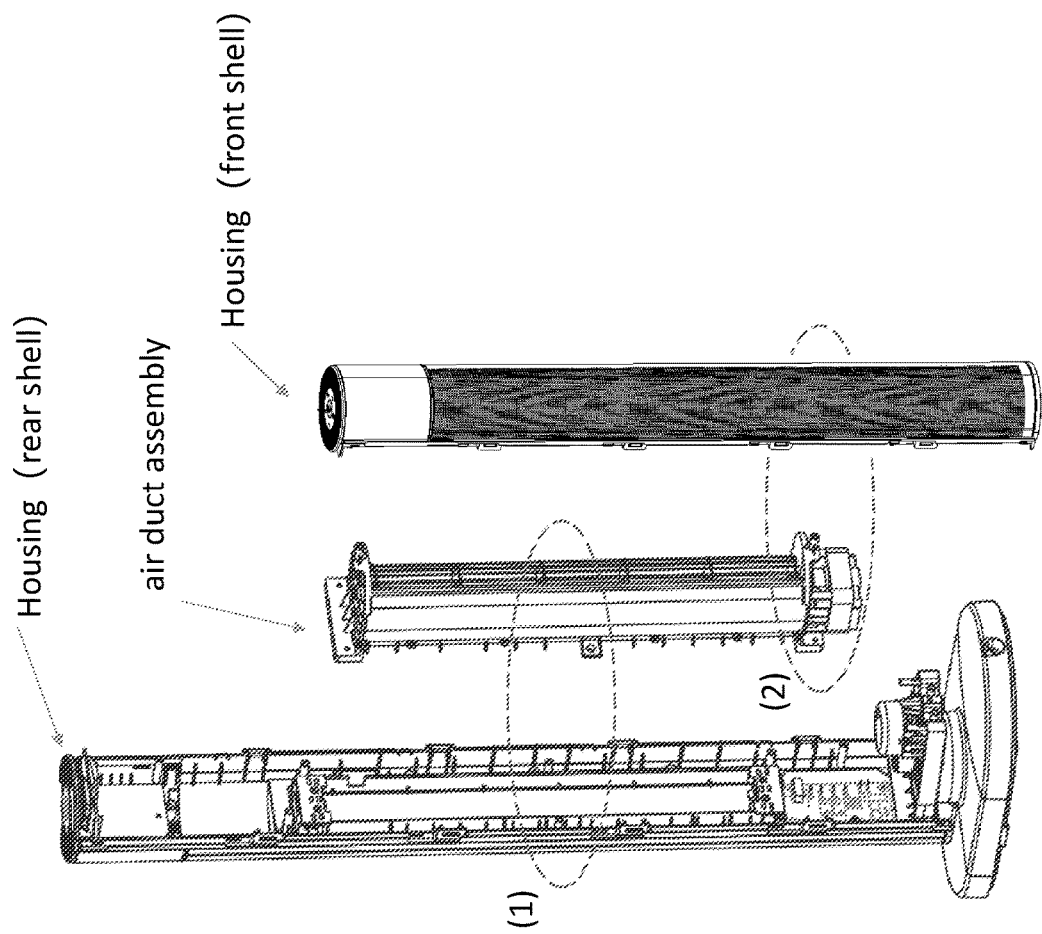
Figure 12:
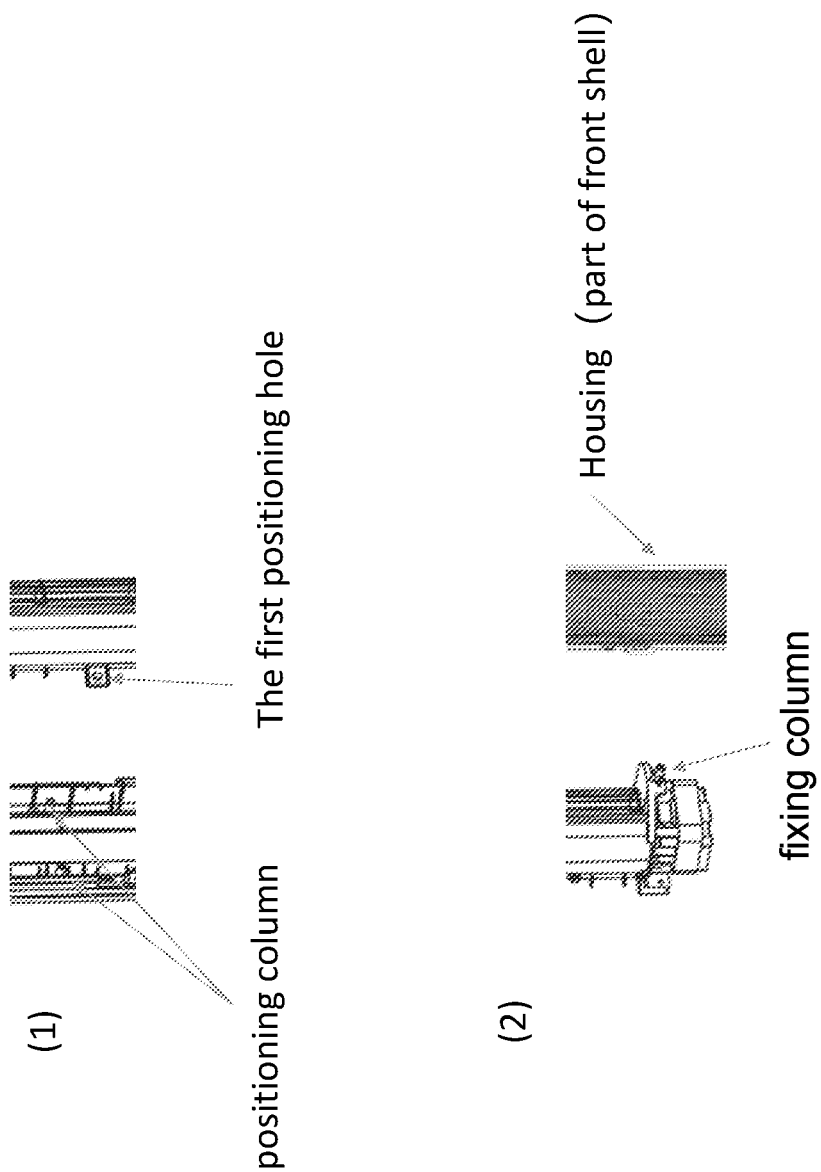

FIG. 10 is a schematic structural view of fan heater of an embodiment of the present disclosure;

FIG. 11. is a schematic structural view of fan heater of an embodiment of the present disclosure;

FIG. 12 is a schematic cross-sectional view of fan heater according to FIG. 11.

DESCRIPTION OF THE REFERENCE NUMERALS

| Reference Numeral | Name | Reference Numeral | Name |
|---|---|---|---|
| 100 | Duct assembly | 153 | Fixed column |
| 10 | Volute | 30 | Volute tongue |
| 11 | First volute tongue member | 31 | Second volute tongue member |
| 13 | First air deflector | 33 | Second air deflector |
| 131 | protrusion | 35 | Second fixing plate |
| 133 | Positioning lug | 351 | Mounting column |
| 1331 | Positioning hole | 50 | Cross-flow wind turbine |
| 135 | Wire buckle | 70 | air duct |
| 15 | First fixing plate | 71 | Air inlet |
| 151 | Mounting hole | 73 | Air outlet |

DETAILED DESCRIPTION OF THE DISCLOSURE

Embodiments of the present disclosure will be described clearly and completely with reference to the drawings. The described embodiment is only a part of the embodiment of the present disclosure, not all of the embodiments.

It should be noted that all directional indicators (such as upper, lower, left, right, front, rear, etc.) in the embodiment of the present disclosure are only used to explain the relative positional relationship, movement, etc. between various assemblies under a specific posture (Referring to the drawings). If the specific posture changes, the directional indicator will also change accordingly.

In the present disclosure, the terms "connected" and "fixed" etc. should be understood in a broad sense, otherwise specified and defined. For example, "fixed" can be a fixed connection, a detachable connection, or an forming a part integrally; It can be a mechanical connection or an electrical connection; It can be a direct connection or an indirect connection through an intermediate medium; and it can be the communication between interior of two elements or the interaction between two elements, otherwise defined.

The present disclosure provides An air duct assembly 100 which applied to a fan heater (not shown).

Referring to FIG. 1 to FIG. 4, in one embodiment of the air duct assembly 100 according to the present disclosure, the air duct assembly 100 includes:

A volute 10 includes a first volute tongue member 11;

A volute tongue 30 positioned in the volute 10, cooperated with the volute 10 to define an air duct 70 having an air inlet 71 and an air outlet 73, and includes a second volute tongue member 31; and A cross-flow wind turbine 50 positioned in the air duct 70 and configured to introduce an airflow into the air duct 70 through the air inlet 71, and blow the airflow in the air duct 70 out through the air outlet 73;

The first volute tongue member and the second volute tongue member are respectively located at two sides of the air inlet, and on a same cross section, an angle between a first line connecting a root portion M of the first volute tongue member to an axis O of the cross-flow wind turbine and a second line connecting a root portion N of the second volute tongue member to the axis O of the cross-flow wind turbine is in a range of 110° to 170°.

At present, the horizontal placement of the fan heater is taken as an example.

In one embodiment, the volute 10 includes a first volute tongue member 11, a first air deflector 13, and two opposite first fixing plates 15. And the first air deflector 13 is connected with the first volute tongue member 11 and configured to extend along the first volute tongue member 11 toward the air outlet 73 of the air duct 70. The two first fixing plates 15 are arranged and disposed opposite to each other in the axial direction of the cross-flow wind turbine 50. And the first volute tongue member 11 and the first air deflector 13 are fixed to the portion between the two first fixing plates 15.

The volute tongue 30 includes a second volute tongue member 31, a second air deflector 33, and two opposite second fixing plates 35. The second air deflector 33 is connected with the second volute tongue member 31 and configured to extend along the second volute tongue member 31 toward the air outlet 73 of the air duct 70. The two second fixing plates 35 are configured to arranged along the axial direction of the cross-flow wind turbine 50 and are oppositely disposed. The second volute tongue member 31 and the second air deflector 33 are fixed to the portion between the two second fixing plates 35. One second fixing plate 35 is fixedly connected with a first fixing plate 15, so that a fixed connection of the volute tongue 30 to the volute 10 is achieved.

Embodiments of the present disclosure, since the size of the angle between the line connecting the root portion M of the first volute tongue member 11 to the axis O of the cross-flow wind turbine 50 and the line connecting the root portion N of the second volute tongue member 31 to the axis O of the cross-flow wind turbine 50 is set from 110° to 170°. The air duct 70 structure is optimized. The leakage flow of the gap between the two volute portions is reduced, the flow state of the leakage flow is improved. And the impact of the leakage flow on the cross-flow wind turbine 50 is reduced. So that the air inlet condition of the wind side vane passage of the cross-flow wind turbine 50 and the internal flow field of the cross-flow wind turbine 50 are effectively improved. The scale of the eccentric worm which inside the cross-flow wind turbine 50 is reduced. The shape and position of the eccentric worm are improved. Thus the eccentric worm is made smaller, rounded, and close to the inner edge portion of the cross-flow wind turbine 50. Hence, the effective flow area inside the cross-flow wind turbine 50 is increased. And the internal flow field of the cross-flow wind turbine 50 is made more stable and the air volume is increased.

It should be noted that the volute 10 and the volute tongue 30 can both be obtained by injection molding from a plastic material, or both can be made of a metal material.

Figure 4:
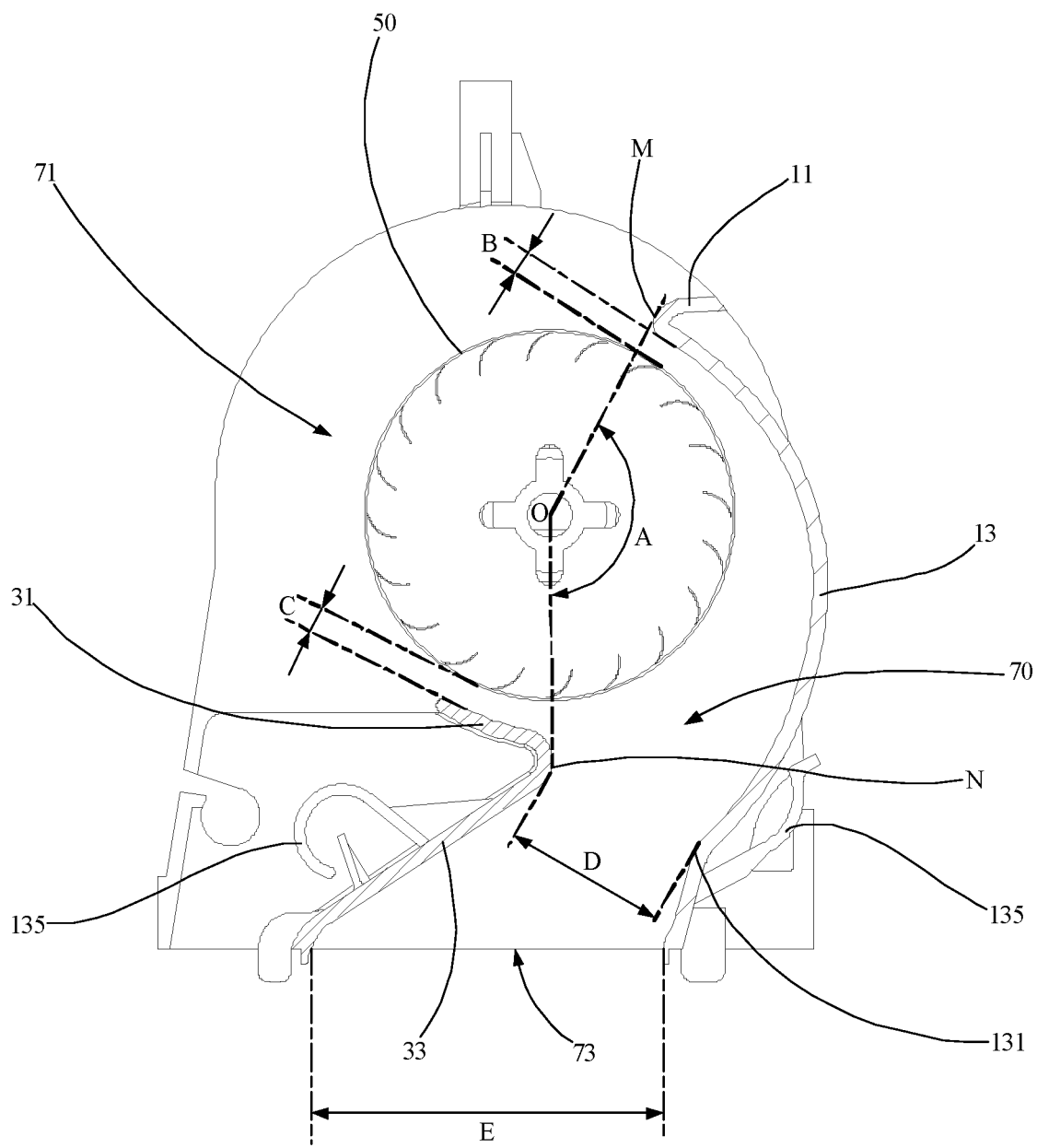
FIG. 4 is a schematic cross-sectional view of the air duct assembly according to FIG. 1.
Figure 5:
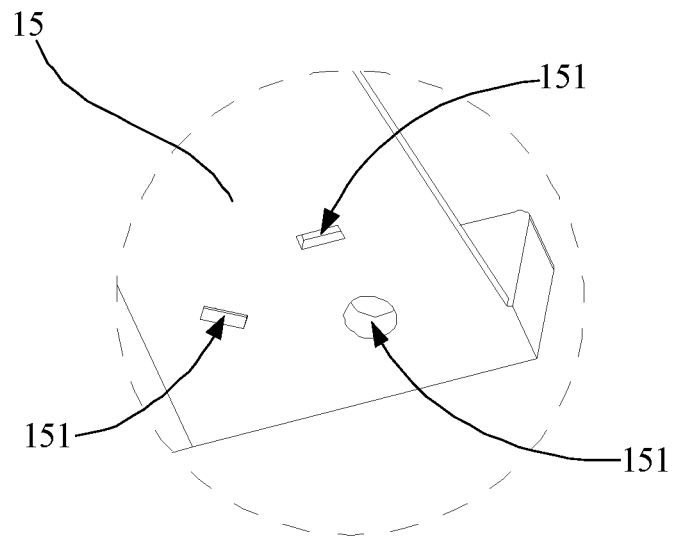
FIG. 5 is a schematic enlarged structural view at V according to FIG. 2.
Figure 6:
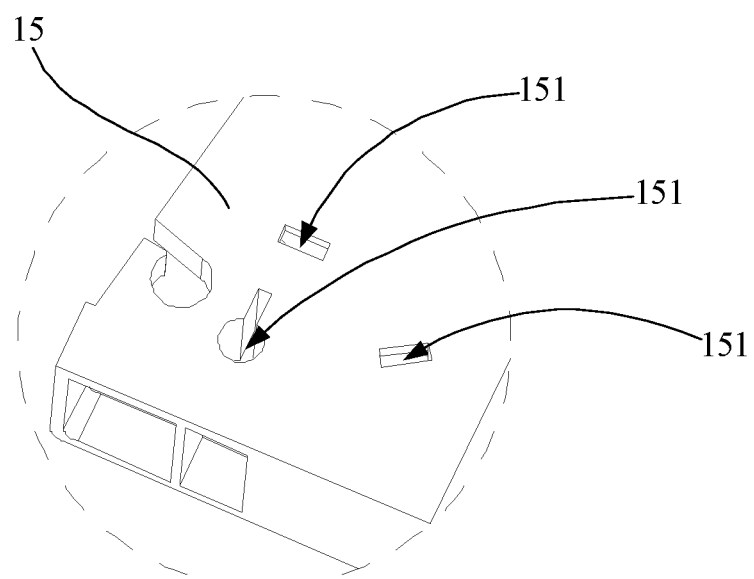
FIG. 6 is a schematic enlarged structural view at W according to FIG. 3.
Figure 7:
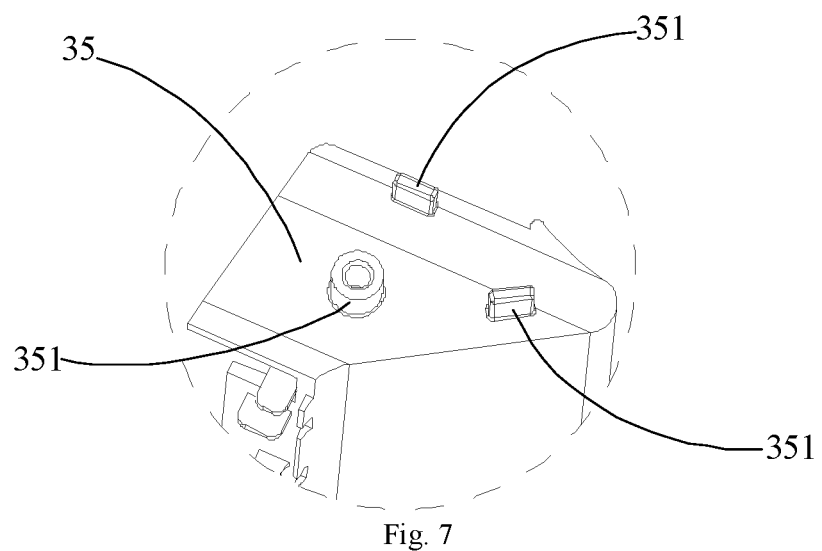
FIG. 7 is a schematic enlarged structural view at X according to FIG. 3.
Figure 8:
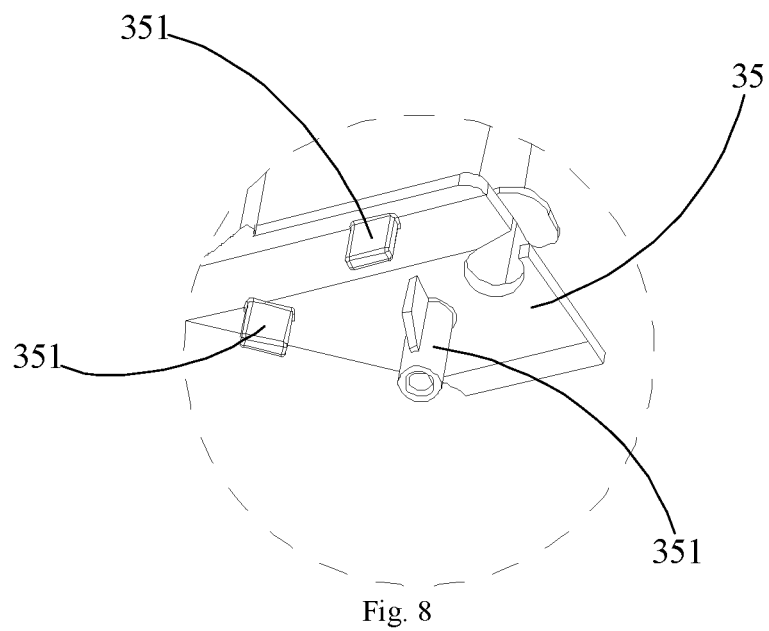

Referring to FIG. 4, a minimum distance B between the first volute tongue member 11 and the cross-flow wind turbine 50 is in a range of 2 mm to 4 mm. Thus, the structure of the volute 10 is optimized, the structure of the air duct 70 is optimized. The leakage between the first volute tongue member 11 and the cross-flow wind turbine 50 is reduced. The internal flow field of the cross-flow wind turbine 50 is improved. Hence, the eccentric worm is improved. The state of the wind is increased. At the same time, the impact on the cross-flow wind turbine 50 is also reduced through the reduction of the leakage flow. And the noise is reduced.

Referring to FIG. 4, a minimum distance C between the second volute tongue member 31 and the cross-flow wind turbine 50 is in a range of 2 mm to 4 mm. Thus, the structure of the volute tongue 30 is optimized, the structure of the air duct 70 is optimized. The leakage between the second volute tongue member 31 and the cross-flow wind turbine 50 is reduced. The internal flow field of the cross-flow wind turbine 50 is improved. Hence, the eccentric worm is improved. The state of the wind is increased. At the same time, the impact on the cross-flow wind turbine 50 is also reduced through the reduction of the leakage flow. And the noise is reduced.

Referring to FIG. 4, a first air deflector 13 includes a first end adjacent to the air outlet 73, a second end away from the air outlet 73 and a protrusion 131 positioned between the first end and the second end, and facing the air duct 70.

It can be understood that the arrangement of the protrusion 131 can improve the flow field which inside the air duct 70. So that the wind pressure and the flow rate of the air flow which inside the air duct 70 are both improved, when the air flow passing through the protrusion 131 due to the shrinkage effect.

Further, the protrusion 131 is at the end of the first air deflector 13 adjacent to the air outlet 73, and a distance D between the root portion N and the protrusion 131 is the shortest distance between the root portion N of the second volute tongue member 31 and any point on the first air deflector 13. In this way, the shrinkage effect can be effectively enhanced. Hence, the wind pressure and the flow rate are further increased.

Referring to FIG. 4, a ratio of the distance D to a width E of air outlet is 1:(from 2 to 2.5). Which the distance D between the root portion N of the second volute tongue member and the protrusion.

Thus, the structure of the air duct 70 is further optimized. And the flow field that inside the air duct 70 is optimized. So that the air flow rate at the air outlet 73 is larger, the wind is blown farther, and the noise is lower.

In one embodiment, the distance D is in a range of 18 mm to 30 mm. And the width E of the air outlet 73 is in a range of 36 mm to 75 mm.

Referring to FIG. 2, FIG. 3, FIG. 4 and FIG. 9, a wire buckle 135 is arranged on a surface of the first air deflector 13 located outside the air duct 70 or on a surface of the second air deflector 33 outside the air duct 70; or the wire buckles 135 are arranged on the surface of the first air deflector located outside the air duct 70 and the surface of the second air deflector outside the air duct 70.

In this embodiment, a plurality of wire buckles 135 are disposed on the surface of the first air deflector 13 outside the air duct 70. And a plurality of wire buckles 135 are also disposed on the surface of the second air deflector 33 outside the air duct 70. Thus, in the actual applying process of the air duct assembly 100, the power line of the driving motor of the cross-flow wind turbine 50 can be locked and located by the wire buckle 135. And the wire buckle 135 being orderly arranged has a guided effect on the wiring of the power line. So that the wiring of the power line is more reasonable and orderly. And the power line is prevented from touching the wind turbine and adversely affecting the rotation of the wind turbine.

Referring to FIG. 2, FIG. 3, and FIG. 5 to FIG. 8, the volute 10 includes: two ends disposed along an axial direction of the cross-flow wind turbine 50, and each of the two end defines a mounting hole 151, the volute tongue 30 includes two mounting columns 351 corresponding to the mounting holes 151, and each of the mounting columns 351 is inserted into each corresponding mounting holes 151.

In this embodiment, the first fixing plate 15 of the volute 10 is configured with a mounting hole 151. Correspondingly, the mounting column protrudes from the second fixing plate 35 of the volute tongue 30 at the portion where the second fixing plate 35 towards the corresponding mounting hole 151. The mounting column 351 is inserted and latched into the mounting hole 151. And the fixed connection between the second fixing plate 35 and the first fixing plate 15 is realized. Hence, the installation of the volute tongue 30 on the volute 10 is completed. In one embodiment, each of the first fixing plates 15 is configured with a plurality of spaced apart mounting holes 151. The corresponding second fixing plate 35 is configured with a plurality of spaced apart mounting posts 351. And each mounting column 351 is inserted and latched into one mounting hole 151 to realize the fixing. And the stability of the volute tongue 30 that mounted on the volute 10 is effectively improved. It can be understood that the installation method above is simple and reliable. And not only the processing and manufacture of assemblies are facilitated, but also the resource consumption and cost invested are saved. And the practicability is higher.

It should be noted that the shape and size of each mounting column are fitted with the corresponding mounting holes. And the mounting columns each other may be the same or different.

The present disclosure also provides a fan heater (not shown) including a housing (not shown) and an air duct assembly in the housing. The air duct assembly is the air duct assembly 100 as previously described.

Figure 3:
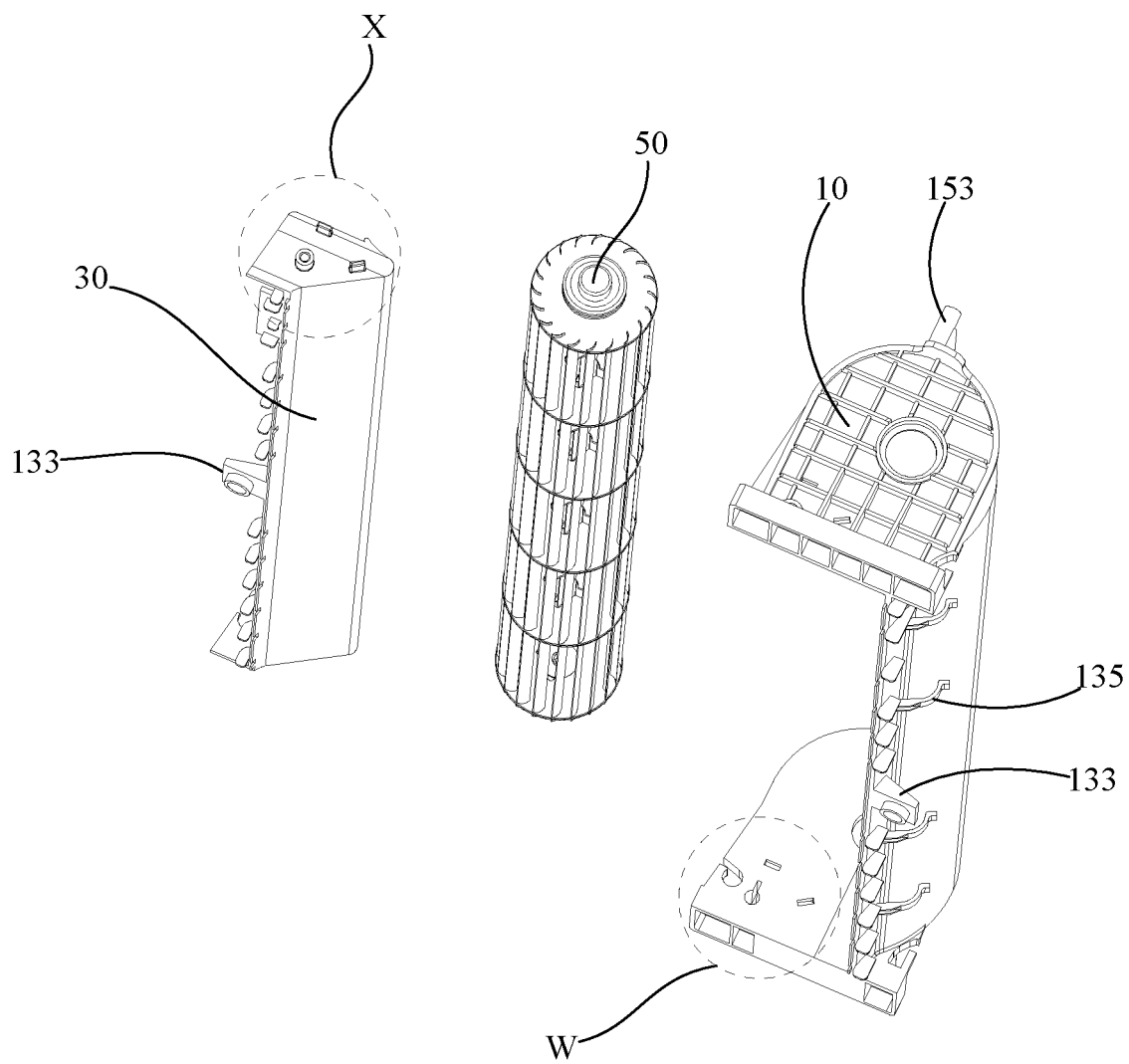
FIG. 3 is a schematic exploded view of another view of the air duct assembly according to FIG. 1.

Further, Referring to FIG. 2, FIG. 3 and FIG. 9. The volute 10 or the volute tongue 30 of the air duct assembly 100 includes a positioning lug 133 having a positioning hole 1331; and the housing of the fan heater includes a positioning column fitted into the positioning hole 1331. Or the volute and the volute tongue of the air duct assembly 100 both includes a positioning lug 133 having a positioning hole 1331; and the housing of the fan heater includes two positioning column, each of the positioning columns is fitted into each one positioning hole 1331.

In this embodiment, the first air deflector 13 of the volute 10 and the second air deflector 33 of the volute tongue 30 are both configured with positioning lugs 133. And the positioning holes 1331 on the positioning lug 133 are used for performing the pre-installation with the positioning column of the fan heater housing when to install the air duct assembly 100 for playing positioning and guiding functions for subsequent installation. Hence, the installation and fixing of the air duct assembly 100 in the fan heater housing are facilitated, and the installation efficiency is improved.

Figure 1:
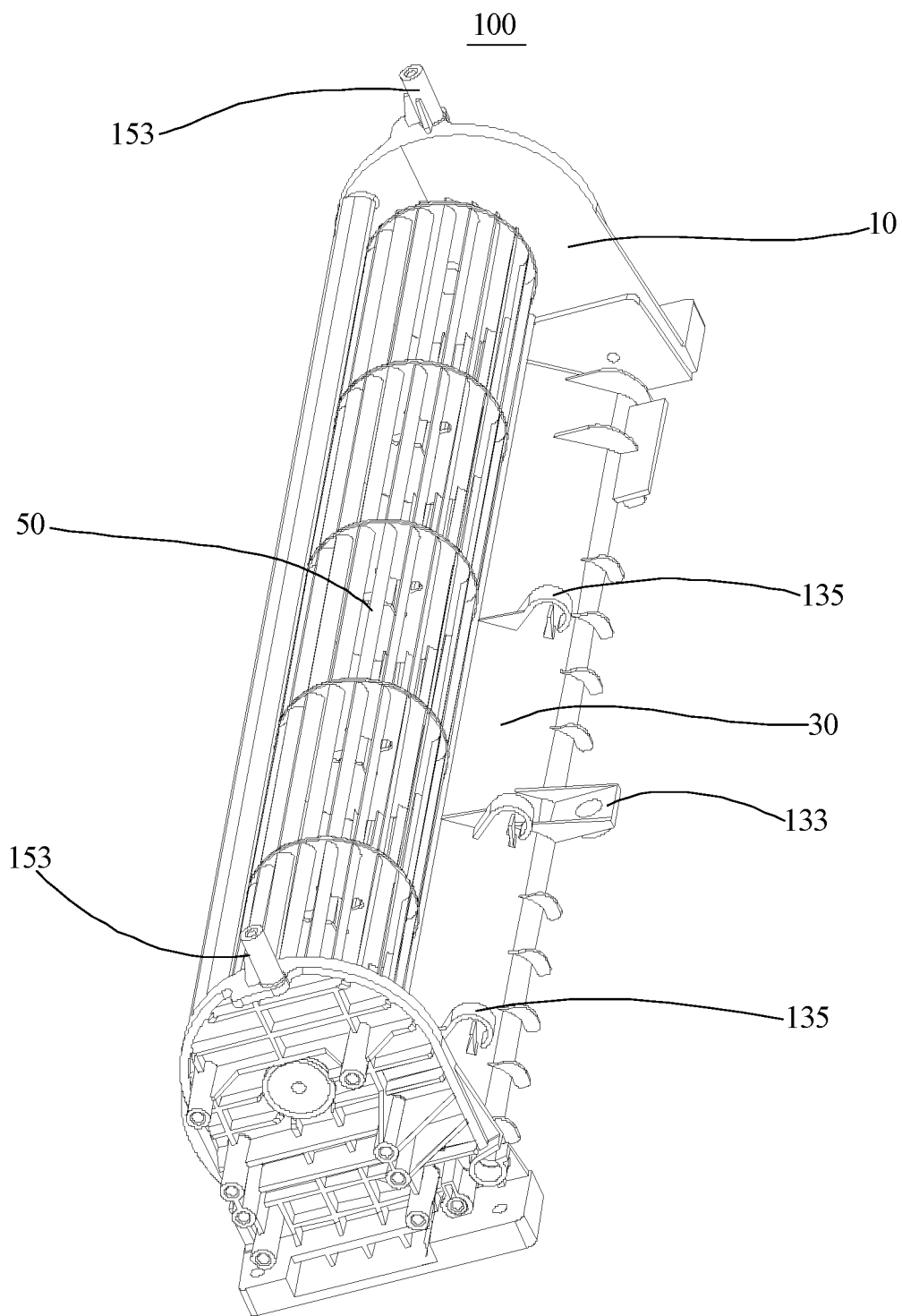
FIG. 1 is a schematic structural view of an embodiment according to An air duct assembly of the present disclosure.

Further, Referring to FIG. 1 to FIG. 3, the volute 10 of the air duct assembly 100 includes a fixing column 153. The fixing column 153 is extended towards and fixed to the housing of the fan heater.

In this embodiment, the two first fixing plates 15 of the volute 10 are respectively configured with a fixing column 153 for fixedly connecting with the housing of the fan heater. Hence, the installation stability and structural reliability of the air duct assembly 100 are effectively improved. And the whole vibration is prevented to ensure the work of the whole machine. It can be understood that the fixing manner of the fixing column 153 and the housing can be a screw connection manner, a snap connection manner, a glue connection manner, a pin connection manner, or other reasonable and effective manner.

What is claimed is:

1. An air duct assembly, applied to a fan heater, comprising:
   a volute comprising a first volute tongue member;
   a volute tongue positioned in the volute, cooperated with the volute to define an air duct having an air inlet and an air outlet, and comprising a second volute tongue member; and
   a cross-flow wind turbine positioned in the air duct, and configured to introduce an airflow into the air duct through the air inlet, and blow the airflow in the air duct out through the air outlet;
   wherein the first volute tongue member and the second volute tongue member are respectively located at two sides of the air inlet; and
   wherein on a same cross section, an angle between a first line connecting a root portion M of the first volute tongue member to an axis O of the cross-flow wind turbine and a second line connecting a root portion N of the second volute tongue member to the axis O of the cross-flow wind turbine is in a range of 110° to 170°;
   wherein the volute comprises: two ends disposed along an axial direction of the cross-flow wind turbine, and each of the two ends define a mounting hole, and
   wherein the volute tongue comprises two mounting columns corresponding to the mounting holes, and each of the mounting columns is inserted into each corresponding mounting hole.

2. The air duct assembly according to claim 1,
   wherein a minimum distance B between the first volute tongue member and the cross-flow wind turbine is in a range of 2 mm to 4 mm.

3. The air duct assembly according to claim 1,
   wherein a minimum distance C between the second volute tongue member and the cross-flow wind turbine is in a range of 2 mm to 4 mm.

4. The air duct assembly according to claim 1,
   wherein the volute further comprises:
   a first air deflector extending towards the air outlet from the first volute tongue member and comprising:
   a first end adjacent to the air outlet;
   a second end away from the air outlet; and
   a protrusion positioned between the first end and the second end, and facing the air duct.

5. The air duct assembly according to claim 4,
   wherein the volute tongue further comprises:
   a second air deflector extending towards the air outlet from the second volute tongue member;
   wherein a surface of the first air deflector located outside the air duct or a surface of the second air deflector located outside the air duct is provided with a wire buckle.

6. The air duct assembly according to claim 4,
   wherein the protrusion is at the first end of the first air deflector adjacent to the air outlet, and
   wherein a distance D between the root portion N and the protrusion is the shortest distance between the root portion N of the second volute tongue member and any point on the first air deflector.

7. The air duct assembly according to claim 6,
   wherein a ratio of the distance D to a width E of air outlet is 1:2 to 1:2.5.

8. The air duct assembly according to claim 7,
   wherein the distance D is in a range of 18 mm to 30 mm.

9. A fan heater, comprising:
a housing; and
an air duct assembly, applied to the fan heater, comprising:
a volute comprising a first volute tongue member;
a volute tongue positioned in the volute, cooperated with the volute to define an air duct having an air inlet and an air outlet, and comprising a second volute tongue member; and
a cross-flow wind turbine positioned in the air duct, and configured to introduce an airflow into the air duct through the air inlet, and blow the airflow in the air duct out through the air outlet;
wherein the first volute tongue member and the second volute tongue member are respectively located at two sides of the air inlet; and
wherein on a same cross section, an angle between a first line connecting a root portion M of the first volute tongue member to an axis O of the cross-flow wind turbine and a second line connecting a root portion N of the second volute tongue member to the axis O of the cross-flow wind turbine is in a range of 110° to 170°, wherein the air duct assembly is in the housing;
wherein the volute comprises: two ends disposed along an axial direction of the cross-flow wind turbine, and each of the two ends define a mounting hole;
wherein the volute tongue comprises two mounting columns corresponding to the mounting holes, and each of the mounting columns is inserted into each corresponding mounting hole.

10. The fan heater according to claim 9,
wherein the volute or the volute tongue of the air duct assembly comprises a positioning lug having a first positioning hole; and the housing of the fan heater comprises a positioning column fitted into the first positioning hole.

11. The fan heater according to claim 9,
wherein the volute of the air duct assembly comprises a fixing column extended towards and fixed to the housing of the fan heater.

12. The fan heater according to claim 9,
wherein a minimum distance B between the first volute tongue member and the cross-flow wind turbine is in a range of 2 mm to 4 mm.

13. The fan heater according to claim 9,
wherein a minimum distance C between the second volute tongue member and the cross-flow wind turbine is in a range of 2 mm to 4 mm.

14. The fan heater according to claim 9,
wherein the volute further comprises:
a first air deflector extending towards the air outlet from the first volute tongue member and comprising:
a first end adjacent to the air outlet;
a second end away from the air outlet; and
a protrusion positioned between the first end and the second end, and facing the air duct.

15. The fan heater according to claim 14,
wherein the volute tongue further comprises:
a second air deflector extending towards the air outlet from the second volute tongue member;
wherein a wire buckle is arranged on a surface of the first air deflector located outside the air duct or on a surface of the second air deflector outside the air duct.

16. The fan heater according to claim 14,
wherein the protrusion is at the first end of the first air deflector adjacent to the air outlet, and
wherein a distance D between the root portion N and the protrusion is the shortest distance between the root portion N of the second volute tongue member and any point on the first air deflector.

17. The fan heater according to claim 16,
wherein a ratio of the distance D to a width E of air outlet is 1:2 to 1:2.5.

18. The fan heater according to claim 17,
wherein the distance D between the root portion N of the second volute tongue member and the protrusion is in a range of 18 mm to 30 mm.

* * * * *